F. G. FARR.
HYDRAULICALLY OPERATED OIL STORAGE TANK.
APPLICATION FILED OCT. 8, 1917.
1,286,970.
Patented Dec. 10, 1918.
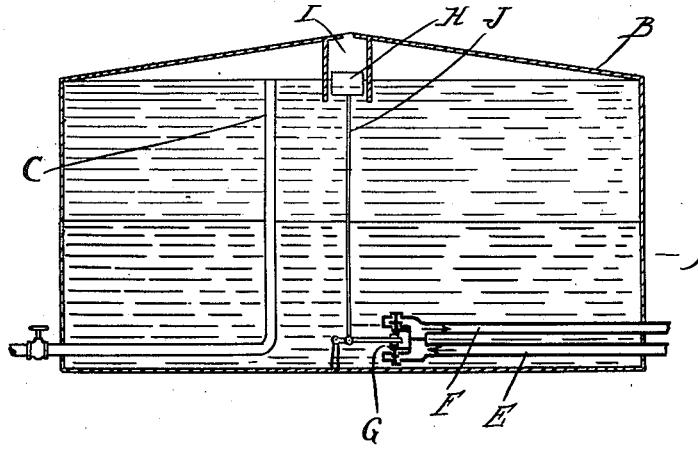
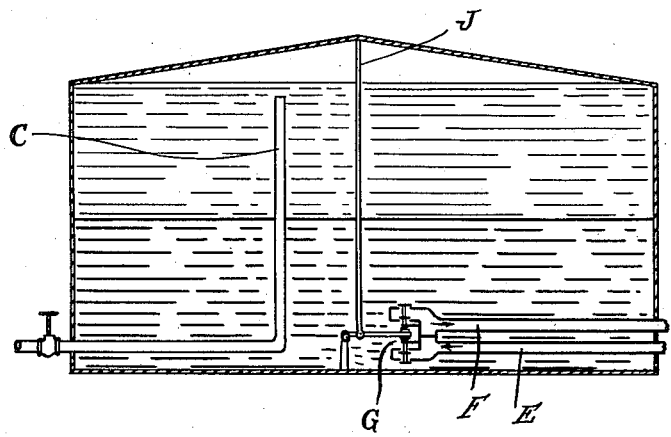
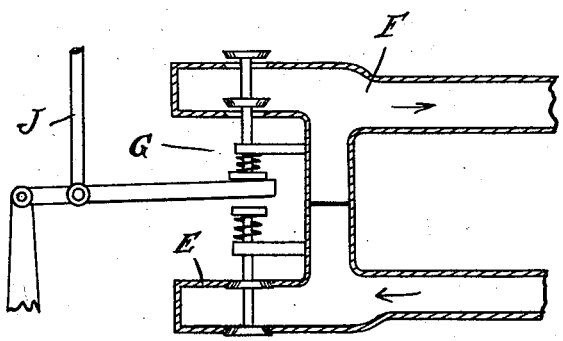
Inventor
Frederick G. Farr

UNITED STATES PATENT OFFICE.

FREDERICK G. FARR, OF DETROIT, MICHIGAN, ASSIGNOR TO HYDRAULIC OIL SYSTEMS CORPORATION, OF DETROIT, MICHIGAN, A CORPORATION OF MICHIGAN.

HYDRAULICALLY-OPERATED OIL-STORAGE TANK.

1,286,970.  Specification of Letters Patent.  Patented Dec. 10, 1918.

Application filed October 8, 1917. Serial No. 195,309.

*To all whom it may concern:*

Be it known that I, FREDERICK G. FARR, a citizen of the United States of America, residing at Detroit, in the county of Wayne and State of Michigan, have invented certain new and useful Improvements in Hydraulically-Operated Oil-Storage Tanks, of which the following is a specification, reference being had therein to the accompanying drawings.

The invention relates to oil storage tanks, such as are used for holding large quantities of oil, either in connection with a pipe delivery line or for any other purpose. It is usual to fill such tanks by pumping the oil thereinto and to empty the tanks by gravity. To exclude the weather the tanks are provided with covers of light gage metal, but these are not capable of withstanding any pressure, nor are they air-tight, as the oil can only be delivered by the filling of the space with air. The contact of the air with the oil and oil-vapors produces a highly-explosive gas which is a source of danger, and furthermore a valuable portion of the oil is lost by absorption into the air.

It is the object of the present invention to provide means for filling and emptying the tank without displacement of air, and further to accomplish this result without placing any pressure upon the tank greatly in excess of the normal hydrostatic pressure. To this end I have devised a system of hydraulic displacement which is automatically controlled by the filling and emptying of the oil and without the placing of additional pressure upon the tank or the cover therefor.

In the drawings:

Figure 1 is a vertical central section through a storage tank to which my improvements are applied;

Fig. 2 is a similar view showing a slightly modified construction; and

Fig. 3 is an enlarged section through the valve.

A is the storage tank of any suitable construction and B is the light-gage metal cover therefore used to exclude the weather. C is an oil inlet and discharge pipe which extends into the tank and preferably has its opening arranged at the top thereof instead of being connected to the bottom, as is usual.

E is a water pipe communicating with the bottom of the tank, through which water may be introduced, and F is a discharge conduit for the water. G is a valve for alternatively opening the pipes E and F, said valve being operated automatically by a slight change in the level of the oil, or by a slight change in the pressure thereon. As shown in Fig. 1, the valve G is operated by a float H arranged in the chamber I at the center and near the top of the tank. The float is connected to the valve by a rod J, and the arrangement is such that a slight rise of the float will operate the valve to open communication with the discharge conduit F, while a slight lowering of the float will close this discharge opening and will open communication with the water admission conduit. As a consequence, whenever oil is introduced into the tank A through the conduit C, this will automatically open the valve G and discharge the water as fast as displaced by the incoming oil. On the other hand, if oil is drawn off from the tank the lowering of the float will automatically open the conduit E to permit entrance of displacement water. In this manner the level of the oil is maintained substantially constant, the variation being only sufficient to actuate the float and its connecting mechanism.

With the construction shown in Fig. 2, in place of a float the top of the tank is completely sealed and the rod for actuating the valve G is connected to this top. The top being formed of light gage metal having a degree of flexibility, it will respond to any slight change in pressure of the fluid so that the introduction of additional oil will raise the pressure and thereby expand the cover and lift the rod, opening the discharge conduit F, while the drawing off of oil will diminish the pressure, contracting the top and operating the valve to close the water outlet and open the water inlet.

With either of these constructions, as well as with other obvious modifications, the level of the oil will be maintained substantially constant, so that there is no displacement of air or contact of the oil therewith which will make an explosive gas.

I am aware that hydraulic displacement of oil has heretofore been used for filling and emptying tanks, but it is the usual practice to provide a fixed head for the water sufficient to lift the oil to a predetermined point when the tank is completely filled therewith. On account of the difference in specific gravity of the oil and water, the level of the oil when the tank is nearly empty, being displaced by water, will not be as high as where the tank is nearly full of oil. Consequently there is a fluctuating level which, with a storage tank such as above described, would cause either a displacement of air or an increase in pressure, which would be dangerous to the light gage cover. My improved system avoids these difficulties by automatically proportioning the pressure or head of the water to that required to support the oil at the predetermined normal level.

What I claim as my invention is:

1. The combination with an oil storage tank and means for introducing and discharging a displacement liquid, of mechanism within the tank automatically operating upon a variation in the volume of oil therein for effecting a complementary variation in the volume of the displacement fluid, whereby a substantially constant level of the oil is maintained.

2. The combination with an oil storage tank, of means for introducing and discharging oil at a predetermined level within said tank, and means automatically controlled by a relatively slight fluctuation in said level for introducing or discharging a complementary volume of displacement fluid, whereby a substantially constant oil level is maintained without regard to variations in the volume of oil within the tank.

3. The combination with an oil storage tank having an oil inlet opening and normally closed inlet and outlet orifices for a displacement fluid in its lower portion, of means automatically controlled by the liquid level within the tank for alternatively opening said inlet and outlet orifices for the displacement fluid.

4. The combination with an oil storage tank having an oil inlet and normally closed inlet and outlet orifices for a displacement fluid in its lower portion, of valves controlling said orifices, and mechanism automatically controlled by variations in the liquid level within the tank for actuating said valves to alternatively open the inlet and the outlet for the displacement fluid.

5. The combination with an oil storage tank having an oil inlet, of inlet and outlet pipes for a displacement fluid extending into the lower portion of said tank, said pipes having alined openings, valves controlling said openings, and mechanism automatically controlled by variations in liquid level within the tank for alternatively opening said valves.

6. The combination with an oil storage tank having an oil inlet, and having an inlet and outlet for a displacement fluid in its lower portion, of valves controlling said inlet and outlet for the displacement fluid, and means for automatically controlling said valves in common to produce variations in the quantity of displacement fluid in the tank complementary to variations of oil in said tank.

In testimony whereof I affix my signature.

FREDERICK G. FARR.